Figure 1:
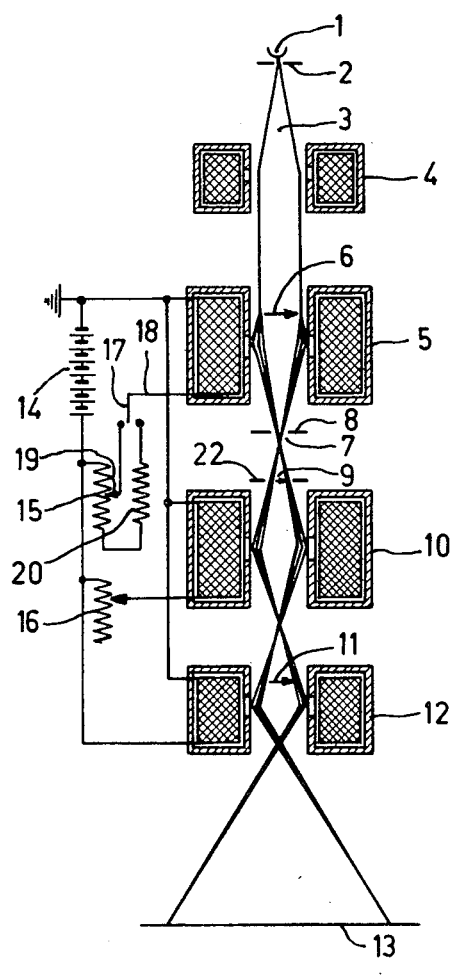

United States Patent

[11] 3,629,575

[72] Inventor: Christiaan Johannes Rakels, Emmasingel, Eindhoven, Netherlands
[21] Appl. No.: 82,141
[22] Filed: Oct. 19, 1970
[45] Patented: Dec. 21, 1971
[73] Assignee: U.S. Philips Corporation, New York, N.Y.
[32] Priority: Aug. 13, 1966
[33] Netherlands
[31] 6611425

Continuation of application Ser. No. 652,804, Dec. 5, 1969, now abandoned, which is a continuation of application Ser. No. 883,671, Dec. 20, 1969, now abandoned. This application Oct. 19, 1970, Ser. No. 82,141

[54] ELECTRON MICROSCOPE HAVING OBJECT LIMITING AND CONTRAST INTENSIFYING DIAPHRAGMS
1 Claim, 2 Drawing Figs.

[52] U.S. Cl. ................................................ 250/49.5 A, 250/49.5 D
[51] Int. Cl. ................................................ H01j 37/26
[50] Field of Search .......................................... 250/49.5 A, 49.5 C, 49.5 D

[56] References Cited
UNITED STATES PATENTS

| | | | |
|---|---|---|---|
| 2,802,110 | 8/1957 | Kazato et al. | 250/49.51 |
| 3,090,864 | 5/1963 | Takahashi et al. | 250/49.51 |
| 3,333,098 | 7/1967 | Ozasa et al. | 250/49.51 |

Primary Examiner—James W. Lawrence
Assistant Examiner—C. E. Church
Attorney—Frank R. Trifari ABSTRACT: An electron-microscope employing a contrast limiting diaphragm and an object-limiting diaphragm between the objective lens and a control lens, a current control device being provided to adjust the energizing current for the objective lens to a fixed value lying outside of a normal control range whereby the focal plane of the objective lens facing the image is shifted from the contrast-intensifying diaphragm to the object-limiting diaphragm.

PATENTED DEC 21 1971　　　　　　　　　　　3,629,575

INVENTOR.
CHRISTIAAN J. RAKELS

BY Frank R. Trifari
   AGENT

ELECTRON MICROSCOPE HAVING OBJECT LIMITING AND CONTRAST INTENSIFYING DIAPHRAGMS

This is a continuation of application Ser. No. 652,804 filed Dec. 5, 1969 which is a continuation of Ser. No. 883,671 filed Dec. 20, 1969 in which both are abandoned.

The invention relates to an electron microscope provided with a contrast-intensifying diaphragm and an object-limiting diaphragm successively arranged between an objective lens and a control lens.

For a normal observation of an electron-optical image of the object, the contrast-intensifying diaphragm, generally referred to as object diaphragm is usually located substantially in the focal plane of the objective lens and passes only the first diffraction maxima associated with the structural details of the object, which maxima must contribute to the formation of a high-contrast image of these details. The passing radiation can be limited to the radiation passed by a given part of the object by arranging a diaphragm having a small aperture in the proximity of the object plane projected by the control lens. This diaphragm is referred to as a "selected area" (S.A.) diaphragm. It provides the possibility of observing within the projection, limited by the size of the image field, a small part without being hindered by surrounding image details. For this purpose, the diaphragm is displaceable and its size is adjustable, or it may be replaced in a single manner by other diaphragms having different apertures of passage because it is readily exchangeable. The diaphragm is not used for a normal observation of the image of the object.

As will be described below, the invention provides the possibility of enlarging the field of applications of the microscope by the use of the S. A. diaphragm.

With the use of the control lens, a high overall magnification can be obtained without it being necessary that magnification of each of the three cooperating lenses is excessively high. The magnification may be varied within wide limits by varying the energization of the control lens, while nevertheless the image screen remains fully occupied. Such a continuous variation of magnification is hardly possible in a two-stage microscope. The case may arise that the microscope should be used not only for an optimum magnification but also for a magnification lower than that which can be produced by the control lens.

The minimum magnification that can be obtained in normal operation of the microscope is reached when the object plane of the control lens coincides with the plane in which the object is arranged. The objective lens is then no longer energized. Such an adjustment is unsatisfactory, however, because a contrast intensifying diaphragm cannot be used.

A high-contrast image formation can be maintained only when such a diaphragm is used.

It is a principal object of the invention to improve the image formation substantially in the minimum magnification range using a contrast-intensifying diaphragm.

According to the invention, a control device is provided in an electron microscope for energizing the objective lens by currents of different strengths. This device permits the energizing current to be adjusted to a fixed value lying outside the normal control range, in which event the focal plane of the objective lens facing the image has shifted from the plane of the object diaphragm to the plane of the object-limiting diaphragm. Instead of selecting a narrow beam from the projecting radiation, the latter diaphragm provided with a small aperture in this case has the same effect as an object diaphragm in normal operation of the microscope.

Figure 2:
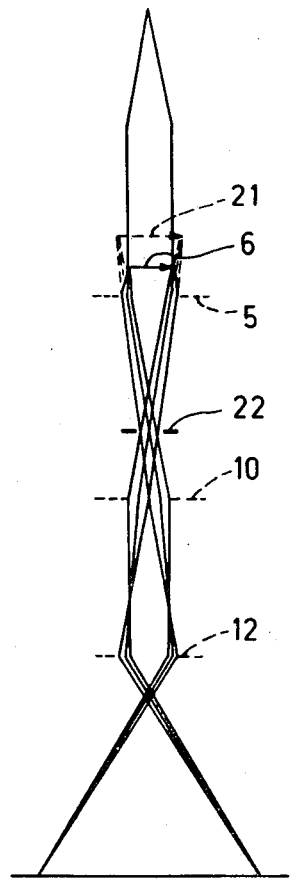

The invention will now be described more fully with reference to the drawing, in which:

FIG. 1 illustrates the normal path of rays of a three-stage microscope having magnetic lenses, and FIG. 2 shows the path of rays at the intended adjustment of the energizing current of the objective lens.

FIG. 1 shows, by way of example, the lens system of a known electron microscope. The cathode 1 emits electrons which are confined to a narrow beam 3 by an anode 2 which is insulated for high voltage from the cathode 1 and is provided with an aperture. The electron beam 3 passes through a condenser lens 4 which further converges the electrons. The objective lens 5 contains the electron beam and comprises the object 6. The dimensions of the lenticular apertures and the width of the electron beam are shown on a greatly exaggerated scale for the sake of clarity. In actual fact, as in the projector lens, the electrons are never spaced from the axis by more than approximately 1 mm.

The electrons are scattered in the object 6 which is shown by splitting up the peripheral rays into a number of diffracted rays each of which follow a given individual path. A minimum cross section 7 is formed at the area at which unidirectional rays meet, that is to say in the focal plane of the lens 5 facing the image. For normal use, an object diaphragm 8 is arranged at this area which masks as far as possible scattered radiation which cannot contribute to the image formation. Because of focusing obtained by the objective lens 5, the rays of each point diffracted in the object 6 meet in a cross-sectional area farther away from the lens 5 in which an intermediate image 9 is formed. The electron rays then pass the control lens 10 which produces a projection 11 of the intermediate image 9 in the image plane of the projection lens 12 which produces the final image on the fluorescent screen 13 or on another radiation-collecting material.

With unchanged projection properties, the variation of the magnification of the projection lens 12 requires a slight variation of the strength of the energizing current of the objective lens and of the adjustment of the current strength for the control lens. The energizing currents are supplied by a battery 14 and applied to the coils of the lenses 5 and 10 with the interposition of the adjustable resistors 15 and 16.

The current circuit of the objective lens 5 includes a commutator 17 by means of which the current supply lead 18 to the coil 5 can be connected to the control member 19 of the adjustable resistor 15 or to a second connection from the battery 14 which includes besides the resistor 15 a fixed resistor 20.

In the first-mentioned case, the electron microscopes can be operated normally and the linear magnification can be varied in a range of, for example, from 3,000 to 60,000 times. An object having a cross section of 3 mm. would then be magnified at a minimum to 900 cm., as a matter of course, only a small part of the object being projected onto the image screen.

When the objective lens 5 is connected to the battery 14 with the interposition of the series-connected resistors 15 and 20, the lens is weakly energized so that the focal distance exceeds by many times the distance by which the image plane, in which the object 6 is arranged, is spaced from the main plane of the lens. This results in the formation of an intermediate image 21—located before the lens and hence unreal—the size of which differs only slightly from the object 6 proper, which is shown in FIG. 2. In the case of a projection by means of the intermediate lens 10 and the magnification lens 11, the projection attained is about 220 times. This adjustment is particularly suitable for making photographic surveys which often facilitate the localization of details which are valuable for given examinations, for example, biological and metallurgical examinations. The indispensable contrast in the image are ensured by the use of a diaphragm 22 which has already been provided for another purpose and which is spaced from the objective lens 5 by a sufficiently large distance to serve at the same time as the object diaphragm for the low magnification aimed at.

While the invention has been described in connection with specific embodiments and applications thereof, other modifications will be apparent to those skilled in this art without departing from the spirit and scope of the invention.

What I claim is:

1. In an electron microscope comprising an electromagnetic objective lens including an energizing coil and having a given focal plane and a given image plane, a control lens and a projector lens, which lenses are arranged in order of succession along the axis of the microscope, a contrast-intensifying diaphragm and an object-limiting diaphragm successively arranged between the objective lens and the control lens, and a source of current for energizing the said objective lens energizing coil, the improvement comprising a variable impedance in series with said current source for adjusting the energizing current for said coil to a value for which the focal plane coincides substantially with the plane of the contrast-intensifying diaphragm and the image plane coincides substantially with the plane of the object-limiting diaphragm, a fixed impedance in series with said variable impedance for supplying a current of fixed magnitude smaller than any current magnitude supplied by the variable means and for which the focal plane of the objective lens substantially coincides with the plane of the object-limiting diaphragm, and means to selectively connect said current source and said variable impedance without said fixed impedance in series with said objective lens energizing coil and to connect said lens in series with said variable and fixed impedance.

* * * * *

UNITED STATES PATENT OFFICE
CERTIFICATE OF CORRECTION

Patent No. 3,629,575　　　　　　　　　　Dated December 21, 1971

Inventor(s) CHRISTIAAN JOHANNES RAKELS

It is certified that error appears in the above-identified patent and that said Letters Patent are hereby corrected as shown below:

TITLE PAGE, Column 1, line 12, "Dec. 5, 1969" should be --July 12, 1967--;

line 14, "Dec. 20, 1969" should be --Dec. 22, 1969--.

Signed and sealed this 20th day of June 1972.

(SEAL)
Attest:

EDWARD M.FLETCHER,JR.　　　　　　ROBERT GOTTSCHALK
Attesting Officer　　　　　　　　Commissioner of Patents